UNITED STATES PATENT OFFICE.

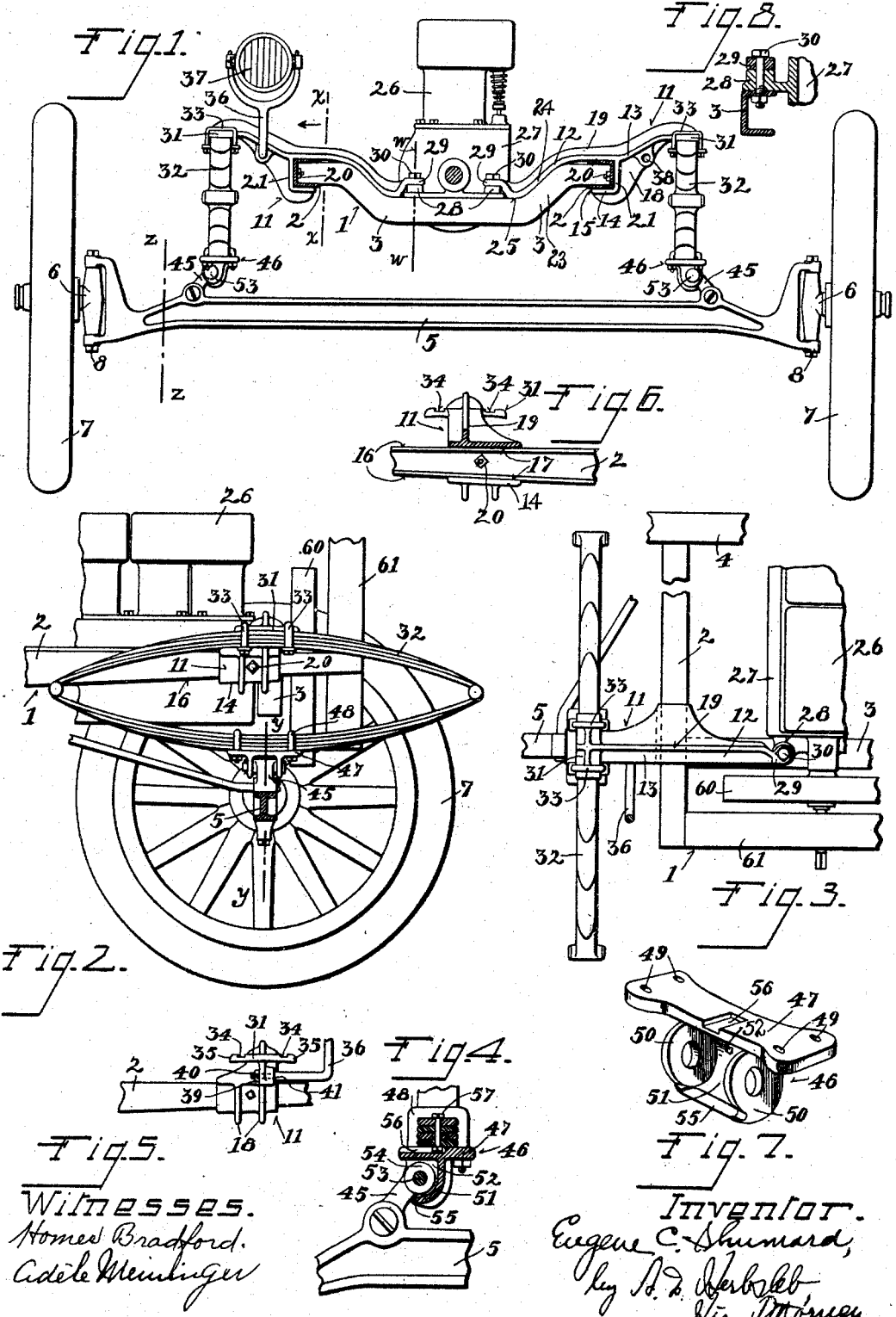

EUGENE C. SHUMARD, OF MILFORD, OHIO.

FRAME SUSPENSION FOR AUTOMOBILES.

No. 927,886.  Specification of Letters Patent.  Patented July 13, 1909.

Application filed June 27, 1908. Serial No. 440,627.

*To all whom it may concern:*

Be it known that I, EUGENE C. SHUMARD, a citizen of the United States, residing at Milford, in the county of Clermont and State of Ohio, have invented certain new and useful Improvements in Frame Suspensions for Automobiles, of which the following is a specification.

My invention relates to means for supporting the front part of the automobile frame upon the front axle through the medium of full elliptic springs and connecting members which are detachably secured to the automobile frame and front axle and the invention will be readily understood from the following description and claims and from the drawing, in which latter:

Figure 1 is a front elevation of my improved device with parts of the automobile removed for better illustration of the invention. Fig. 2 is a side elevation of the same shown in connection with the front part of the automobile and with the front axle in section on the line $z$—$z$ of Fig. 1. Fig. 3 is a plan view of the same. Fig. 4 is a detail in vertical section on the line $y$—$y$ of Fig. 2. Fig. 5 is an end elevation of the suspension bracket showing its connection with the frame. Fig. 6 is a vertical section of the same taken on the line $x$—$x$ of Fig. 1. Fig. 7 is a perspective view of the supporting yoke; and, Fig. 8 is a detail in vertical section on the line $w$—$w$ of Fig. 1 showing the securing means for the inner end of the suspension bracket.

1 indicates the automobile frame comprising the side-members 2, the front cross-member 3 and the rear cross-member 4, which latter connects with the side-members at the rear part of the frame, so much only of the side and rear members being shown however as is necessary to illustrate my invention.

5 is the front axle to which the wheel-spindles 6, receiving the front wheels 7, are pivoted at 8 in any ordinary or well-known manner.

11 11 represent suspension brackets for the automobile-frame which respectively comprise an inwardly extending arm 12, an outwardly extending arm 13 and a flange 14 for forming a groove 15 in which the side-member 2 is received. The side-members preferably taper toward their front ends as shown at 16, the upper and lower walls of said groove being correspondingly tapered as shown at 17 for forming a snug fit between the parts and preventing rearward creeping of the suspension-brackets upon said side-members. The flange may be connected with the arm 13 by means of ribs 18, and a rib 19 may extend longitudinally of the arms 12 13. A bolt 20 may connect the side wall 21 of the groove 15 with the side-member of the frame. These side-members are shown as of channel form in cross-section.

26 indicates the engine, the frame 27 of which is provided with lugs 28 which receive support upon the front cross-member 3, which latter is provided with a depression 25 at said point of support. The arms 12 of the suspension-brackets are preferably provided with downward curves 24 corresponding with the form of the end walls 23 of said depression. The inner ends of the suspension brackets are provided with lips 29 between which and said front cross-member the lugs 28 are received, bolts 30 passing through said lips, lugs and cross-member for securing said parts together. The outer end of each of the suspension brackets is formed as a plate 31 for resting upon the full elliptic springs 32 to which it may be suitably secured as by means of straps 33 lying in the grooves 34 of the wings 35 of said plates and secured about the upper member of said spring. The suspension brackets may be provided with securing means for supporting a lamp or lamps. Thus a lamp-bracket 36 for supporting a lamp 37 is received in an aperture 38 in the suspension bracket. The lamp-bracket is suitably secured in said aperture, as by a nut 39 received about the reduced end 40 of the lamp-bracket, for clamping the shoulder 41 of the lamp-bracket against the suspension-bracket.
45 are lugs extending upwardly and inwardly from the front axle rigid with said front axle.

46 are supports for the springs and are attached to the lugs 45. These supports are preferably in the form of yokes and respectively comprise a plate 47 upon which the lower member of the full elliptic spring rests and to which the said spring is rigidly secured by means of straps 48 received about said spring and passing through apertures 49 in said plate. Bearings 50 depend from said plate and are connected by a web 51 for forming a socket 52 within which the respective lugs 45 are received. A pin 53 passes through the bearings 50 and the bearing 54 in the upper part of the lug 45 for pivotally supporting the yokes 46 upon said lugs. The web 51 is provided with a contact-face 55 arranged to make contact with the inner side of the lug 45 for limiting the pivotal movement of said supports, said contact-faces being directed outwardly against the inner faces of the lugs at the respective ends of the front axle. The upper face of the support is provided with a recess 56 for receiving the bolt 57 of the lower member of the elliptic spring. This construction, while providing sidewise yield to the automobile-frame 1 against the resistance of the springs for providing easy riding, will limit this yield for normally positioning said frame above the middle of the front axle and prevent undue sidewise movement of the said frame.

60 represents the fly-wheel of the engine, and 61 represents the radiator.

My improved construction forms a convenient means for readily assembling the spring-suspension of the automobile frame upon the front axle, and permits the employment of full elliptic springs between the front end of the automobile frame and the front axle.

Having thus fully described my invention, what I claim as new and desire to secure by Letters Patent is:

1. In automobile frame suspension, the combination with the automobile frame, of a front axle provided with a pair of lugs rigid thereon, the said lugs slanting toward each other, a full elliptic spring at each side of said automobile frame upon which said automobile frame is suspended, a cupped support rigidly secured to each of said springs, the said cupped supports having mouths which open outwardly and receive said respective lugs, and securing means between said supports and lugs, substantially as described.

2. In automobile frame suspension, the combination, with the automobile frame comprising side-members, and the front axle, of a suspension bracket at each side of said frame; each of said brackets comprising an inwardly extending arm extending inside said frame, an outwardly extending overhanging arm overhanging said frame, and an inwardly extending flange between said arms forming a groove; the said side-members of said frame received in the grooves of said respective brackets, means for securing said brackets to said frame, and full elliptic springs received between and secured to said respective outwardly extending overhanging arms and said front axle.

3. A suspension bracket for the front end of an automobile frame comprising an inwardly extending arm arranged to extend inside said frame, an outwardly extending arm arranged to overhang said frame and a flange between said arms spaced from said arms and having connection therewith for forming a groove arranged for receiving the side-member of the automobile frame against the three walls of said groove.

4. A suspension bracket for the front end of an automobile frame comprising an inwardly extending arm arranged to extend inside said frame, an outwardly extending arm arranged to overhang said frame and a flange between said arms spaced from said arms and having connection therewith for forming a groove arranged for receiving the side-member of the automobile frame against the three walls of said groove, said suspension-bracket being provided with a socket for receiving a lamp-bracket.

5. In automobile frame suspension, the combination, with the automobile frame, suspension-brackets extending laterally of said automobile frame, an engine frame provided with lugs received between the inner ends of said suspension-brackets and automobile frame, and means for securing said parts together in the relation stated.

6. In automobile frame suspension, the combination of an automobile frame comprising side-members and a front cross-member, said front cross-member being provided with a depression having curved end-walls intermediate of the ends of said front cross-member, suspension brackets provided with inwardly extending arms having downward curves corresponding with said end-walls of said depression, said suspension brackets being provided with flanges received about said side-members, and means for securing the inner ends of said suspension brackets to said cross-member.

7. In automobile frame suspension, the combination of an automobile frame comprising side-members and a front cross-member, said front member being provided with a depression having curved end-walls intermediate of its ends, suspension brackets provided with inwardly extending arms having downward curves corresponding with said end-walls of said depression, said suspension brackets provided with flanges received about said side-members, the inner ends of said suspension brackets being provided with lips spaced from said front cross-member, an engine frame provided with lugs located in the space between said lips and front cross-member, and means for securing said lips, lugs and cross-member together.

8. In automobile frame suspension, the combination, with the frame comprising side-members and a front cross-member, of an axle; a pair of suspension brackets having inwardly extending arms received above said front cross-member, outwardly extending arms extending laterally of said frame, and depending flanges received under said side-members; yokes secured to said front axle, and a pair of full elliptic springs secured to the outer ends of said respective outwardly extending arms and said yokes, substantially as described.

9. In automobile frame suspension, the combination, with the automobile frame comprising the side-members and the front-member having a median depression having curved end-walls, of an axle; a pair of suspension brackets having inwardly extending arms curved to correspond to said curved end walls, outwardly extending arms overhanging said frame laterally, and depending flanges received about said side-members; means for securing the inner ends of said suspension brackets to said cross-member, yokes secured to said axle, and full elliptic springs secured to the overhanging ends of said suspension brackets and said yokes.

10. In automobile frame suspension, the combination, with the automobile frame comprising the side-members and the front cross-member having a median depression having curved end-walls; of a pair of suspension brackets having inwardly extending arms curved to correspond to said curved end-walls, outwardly extending arms over-hanging said frame laterally, and depending flanges received about said side-members; means for securing the inner ends of said suspension brackets to said cross-member, yokes secured to said axle, full elliptic springs secured to the overhanging ends of said suspension brackets and yokes, the inner ends of said suspension brackets having lips spaced from said cross-member, an engine provided with lugs located in the space between said lips and cross-member, and bolts for securing said lips, lugs and cross-member together.

In testimony whereof, I have subscribed my name hereto in the presence of two subscribing witnesses.

EUGENE C. SHUMARD.

Witnesses:
O. S. BRYANT,
ADÈLE MEININGER.